March 3, 1936.  J. L. ANDERSON  2,032,733
UNIVERSAL CUTTING OR WELDING MACHINE
Filed Jan. 5, 1934  3 Sheets-Sheet 1
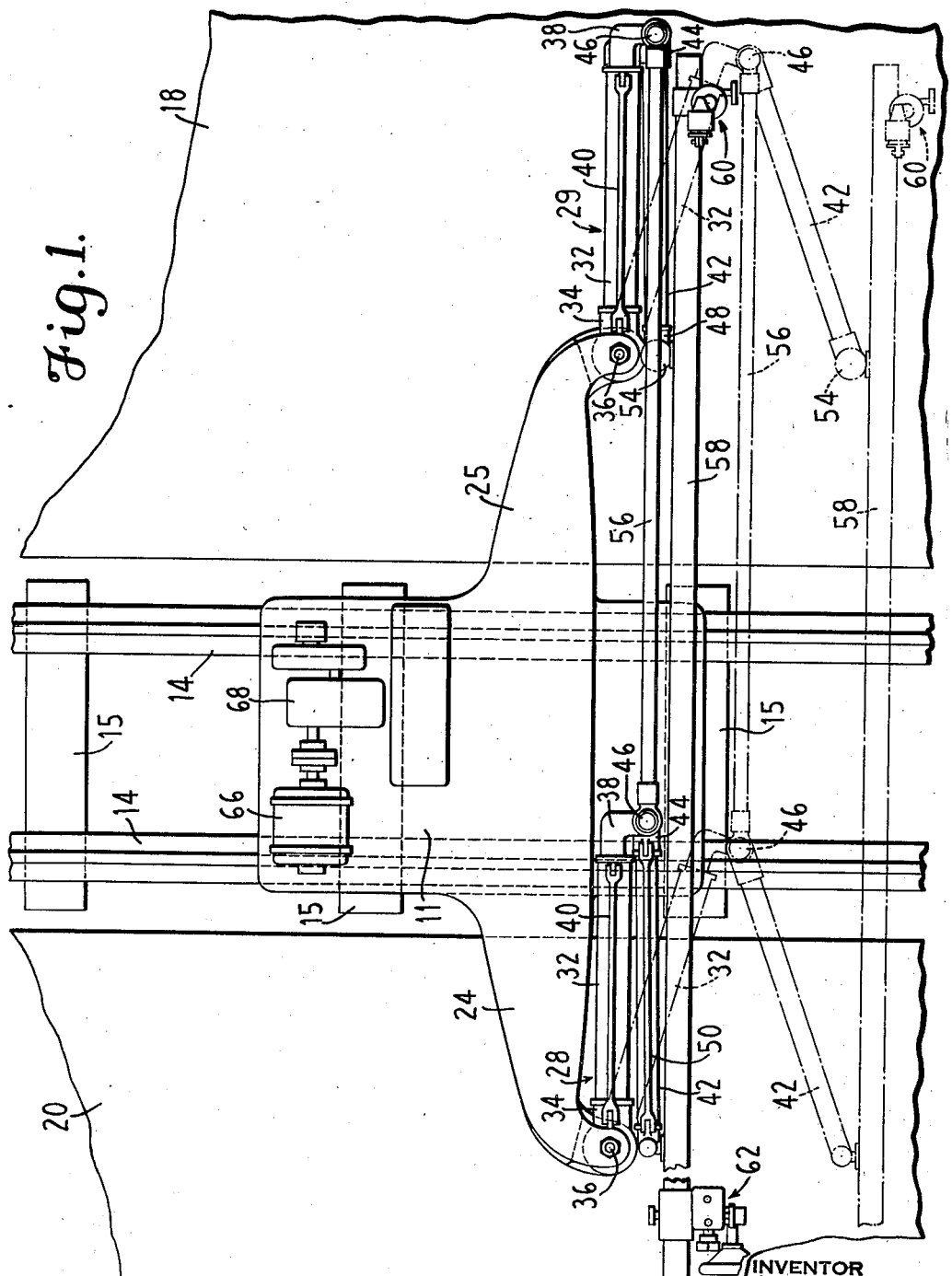

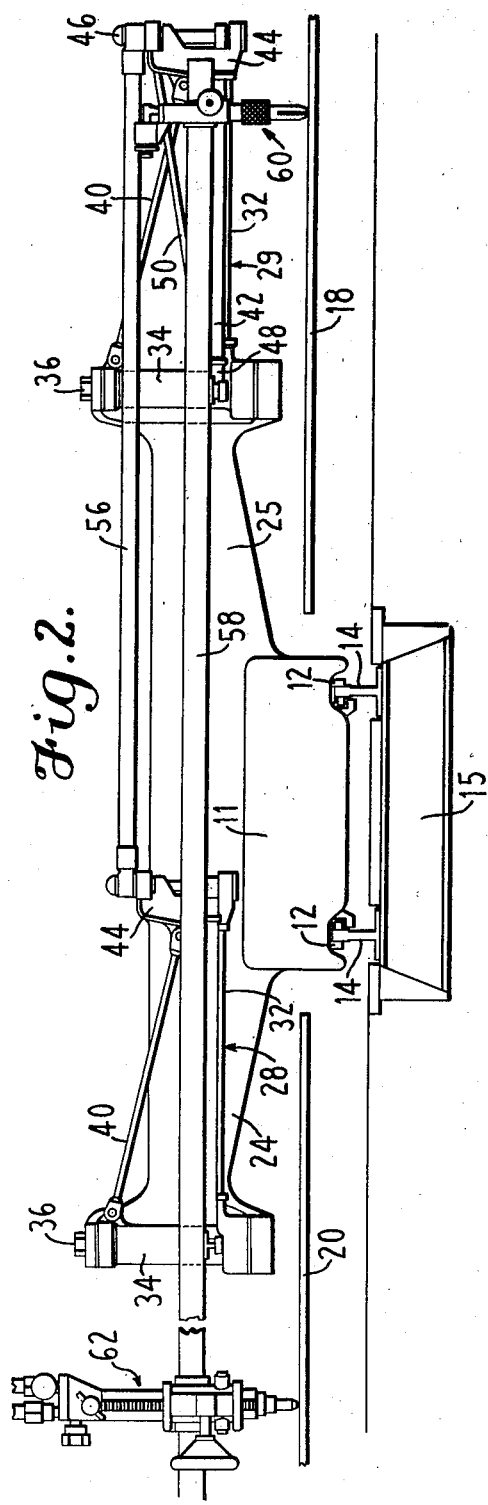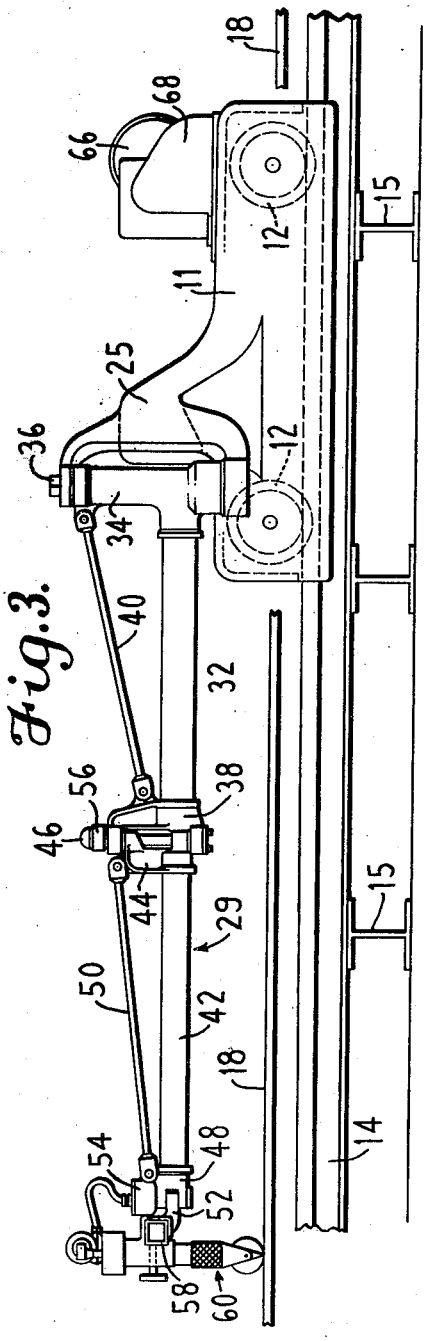

March 3, 1936.  J. L. ANDERSON  2,032,733
UNIVERSAL CUTTING OR WELDING MACHINE
Filed Jan. 5, 1934   3 Sheets-Sheet 3
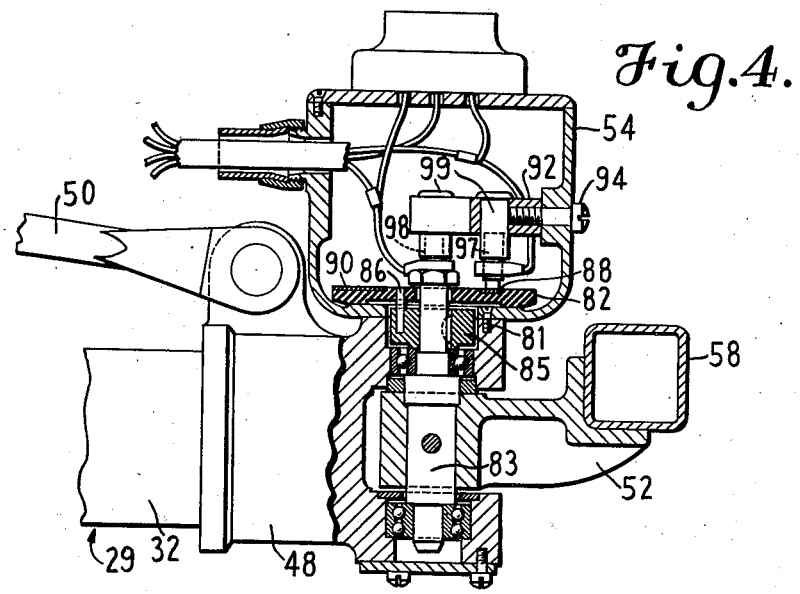
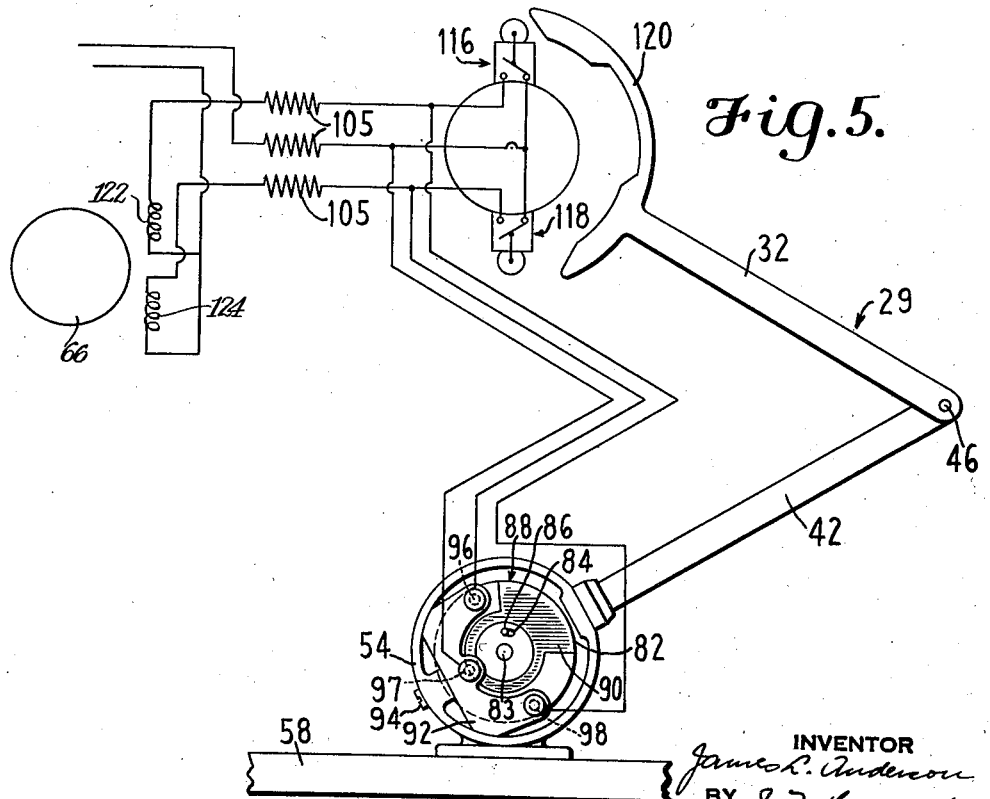
INVENTOR
James L. Anderson
BY
ATTORNEY Patented Mar. 3, 1936

2,032,733

UNITED STATES PATENT OFFICE 2,032,733

UNIVERSAL CUTTING OR WELDING MACHINE

James L. Anderson, Closter, N. J., assignor to Air Reduction Company, Incorporated, New York, N. Y., a corporation of New York Application January 5, 1934, Serial No. 705,343

21 Claims. (Cl. 266—23)

This invention relates to cutting or welding apparatus and particularly to tracer-controlled universal torch machines.

The term "tracer" is used in a broad sense in this specification to denote any driving wheel or template follower which controls the direction of movement of the torch.

It is an object of this invention to provide an improved cutting or welding machine of the type having a tracer and torch supported for universal movement in a plane with respect to a carriage which is itself movable during a cutting or welding operation to increase the size of the field over which the tracer and torch can travel.

More specific objects of the invention are to locate the torch and tracer fields on opposite sides of the carriage and obtain wider areas over which the torch and tracer can move, and to connect the supporting means for the torch and tracer with the carriage in a manner which obtains wider operating fields for the torch and tracer in proportion to the length of the universal supporting means than has been obtained by the prior art.

A machine embodying this invention has a larger field of operation than prior machines of comparable size, and for a given piece of work this invention permits the use of a machine of smaller size and less weight, and consequently lower cost. A shorter overhanging arm decreases the unbalanced weight of the machine and insures steadier and more accurate movement of the torch.

Other objects, features and advantages of the invention will appear or be pointed out as the specification proceeds.

In the accompanying drawings, forming part hereof:

Fig. 1 is a top plan view of a cutting or welding machine embodying the invention;

Fig. 2 is a front view of the machine shown in Fig. 1;

Fig. 3 is a side elevation of the machine shown in Figs. 1 and 2, but with the arms extended;

Fig. 4 is an enlarged vertical section through a part of the circuit control mechanism; and Fig. 5 is a diagrammatic enlarged top plan view of the switch mechanism showing the wiring connections to the motor.

A truck or carriage 11 has wheels 12 which stably support it on a track 14. The track 14 has two rails connected to ties 15. The wheels 12 are flanged for operation on the track, but other types of wheels can be substituted when the carriage is operated on other kinds of supporting surfaces.

A drawing or pattern table 18 is located on one side of the track 14, and a work table 20 is located on the other side of the track. Both of these tables extend lengthwise along the track and the cutting or welding field of the machine can be made as long as desired since it is limited only by the length of the track.

Arms 24 and 25 are integral or rigid with the carriage 11, and extend from opposite sides of the carriage. Jointed arms 28 and 29 are pivotally connected with the respective arms 24 and 25 of the carriage.

The jointed arm 29 is best shown in Fig. 3, and has a rearward link which includes a tubular portion 32 having a T connection with a bearing sleeve 34 which is connected to the arm 25 by a pivot pin 36. An end casting 38 on the forward end of the link 32 is connected to the bearing sleeve 34 by a tension member or brace 40 which extends at an angle to the tubular portion 32 and braces the rearward link against vertical loads.

The jointed arm 29 has a forward link which includes a tubular portion 42 connected to an end casting 44. This end casting is connected with the end casting 38 by a pivot pin 46 and comprises with these parts the joint of the arm 29. An end casting 48 at the forward end of the tubular portion 42 is connected with the end casting 44 by a tension member or brace 50. A bracket 52 is pivotally connected to the forward end casting 48, and there is a switch cup 54 on top of this end casting 48.

The other jointed arm 28 is similar in construction to the jointed arm 29 except that it has no switch cup 54 on its forward end casting. A link 56 connects the jointed arms 28 and 29 at their joints and a front bar 58 is secured to the bracket 52 of the jointed arm 29 and to a similar bracket at the forward end of the jointed arm 28. This folding parallelogram frame supports the front bar 58 for movement parallel to itself in any and changing directions in a plane.

The front bar 58 is considerably longer than the width of the track or other surface on which the carriage moves. A motor-driven tracer 60 is connected with the bar 58 near one end, and a cutting or welding torch 62 is fastened to the other end of the front bar 58. Since the front bar always moves parallel to itself, the torch and tracer, which are connected by this front bar, always follow similar courses whether the carriage 11 is stationary or in motion.

The width of the field over which the torch and tracer can operate depends on the length of the fixed arms 24 and 25 and the length of the jointed arms 28 and 29. A stronger and more rigid machine is obtained by having the fixed arms 24 and 25 extend over the pattern and work tables as shown in the drawings. With this design, shorter jointed arms are practical, and this is a distinct advantage because the shorter arms reduce the unbalanced weight and subject the bearings to less wear. The rigidity of the short jointed arms insures against irregularities in the torch movement caused by flexing of the links of the jointed arms. The maximum advantage from these fixed arms 24 and 25 is obtained when they extend half way across the torch and tracer fields, because the jointed arms cover the widest area when their pivot connections to the carriage arms are on the center lines of the pattern and work tables.

The tracer and torch are clamped to the front bar 58 and are adjustable lengthwise along the bar. The distance between the torch and tracer transverse of the direction of movement of the carriage is preferably at least twice as great as the tread of the carriage wheels or width of the track or other supporting surface on which the carriage runs.

In Fig. 1 the parts are shown in full lines with the jointed arms 28 and 29 folded in close to the fixed arms 24 and 25. When the machine is operating, the carriage moves along the track before the jointed arms fold as completely as shown in full lines in this view. The parts are shown by dot and dash lines in one of the positions which they may assume during a cutting or welding operation.

The carriage wheels are driven intermittently, to move the carriage along the track, by an electric motor 66 which is operatively connected with the wheels at one end of the carriage through reduction gearing 68.

With the parts in the positions shown in dot and dash lines in Fig. 1, the carriage is stationary and the movement of the tracer is transmitted through the front bar 58 to the torch which is moved along a path similar to that followed by the tracer. Whenever the movement of the tracer causes the front bar 58 to move in close to the carriage so that the jointed arms approach the folded positions shown in full lines in Fig. 1, the motor 66 is started and the carriage moves away from the front bar at a speed greater than the linear speed of the tracer until the front bar is again well out from the carriage.

Whenever the movement of the tracer causes the front bar 58 to move away from the carriage until the jointed arms are almost fully extended, the motor 66 is started in a reverse direction and drives the carriage toward the front bar at a speed faster than the lineal speed of the tracer until the jointed arms are partly folded and the front bar no longer near its limit of movement with respect to the carriage.

For a machine of small size, most types of tracers have sufficient traction to move the carriage if the motor 66 and its driving connections are dispensed with. The invention is intended primarily for machines having large cutting or welding fields, however, and with such machines it is necessary for the carriage to have its own driving mechanism.

Electric switches for automatically starting and stopping the carriage, and the wiring connections are shown diagrammatically in Figs. 4 and 5.

Fig. 4 shows the electric switch means in the cup 54. This cup is fastened to the end casting 48 by screws 81. A disc 82 is of insulating material and has a central opening. A shaft 83 serves as the pivot pin to connect the end casting 48 with the bracket 52. This shaft is pinned to the bracket 52 and extends through the central opening in the disc 82.

The disc 82 rests on the bottom of the cup 54 and has an arcuate slot 84 (Fig. 5). A collar 85 is keyed to the shaft 83 and has a rigid pin 86 extending up through the slot 84. The pin 86 and slot 84 constitute a lost motion connection between the disc 82 and collar 85.

The disc 82 has a conductor ring 88 concentric with the axis of the shaft 83. The conductor ring 88 has a wide sector 90 of slightly more than 90°.

A brush holder 92 is connected to the cup 54 by a screw 94. Three brushes 96, 97 and 98 are supported by the brush holder and are insulated therefrom by insulating bushings 99.

When the angular relation between the front bar 58 and the forward link of the arm 29 changes, the disc 82 turns with respect to the cup 54 and brush holder 92. The brush 97 is in position to contact with the narrow portion of the conductor ring 88, and therefore contacts with the conductor ring for all angular positions of the front bar 58 and forward link of the arm 29. The brushes 96 and 98 are located further from the shaft 83 and contact with the disc 82 outside of the conductor ring 88 except when the wide sector 90 of the ring is under them.

As the front bar 58 moves away from the carriage, its angle with the forward link of arm 29 increases. Before the front bar reaches the limit of its movement away from the carriage, this angle becomes 80° and the brush 98 contacts with the wide sector 90 of the conductor ring and closes a circuit from the brush 98 through the conductor ring to the brush 97. The closing of this circuit causes the motor 66 to drive the carriage toward the front bar 58 at a faster speed than that of the tracer, with the result that the carriage moves closer to the front bar 58 and prevents the movement of the front bar from being limited by the length of the jointed arms.

As the carriage moves closer to the front bar 58, the angle between the front bar and the forward link of arm 29 decreases, and the cup 54 and brush holder 92 rotate with respect to the shaft 83 and about the axis of this shaft as a center. The friction between the cup 54 and the bottom of the disc 82 causes the disc to rotate with the cup through a small angle, depending on the length of the arcuate slot 84, but after turning through this angle the end of the slot 84 strikes the pin 86 and the disc 82 is prevented from rotating further. The brush 98 moves away from the wide sector 90 and into contact with the insulating portion of the disc 82, thus breaking the circuit and causing the carriage to stop.

If the front bar 58 moves toward the carriage until the forward link of the arm 29 makes an angle of approximately 12° with the front bar 58, the brush 96 will move into contact with the wide sector 90. When the brush 96 touches the wide sector 90, a circuit is closed from the brush 96 through the conductor ring 88 to the brush 97 and the motor 66 is operated to drive the carriage away from the front bar 58 at a speed faster than the lineal speed of the tracer so that the carriage moves away from the front bar 58 and increases the angle between this front bar and the forward link of arm 29.

The slot 84 permits the disc 82 to rotate with the cup 54 through a small angle. After this angular movement the pin 86 prevents the disc 82 from turning further and the brush 96 moves onto the insulating portion of the disc 82, breaking the circuit and causing the motor to stop.

After the carriage stops, the tracer may continue to move the front bar 58 toward the carriage so that the angle between the front bar and forward link of arm 29 again decreases. The circuit to the carriage motor 66 is not immediately closed, however, because the disc 82, cup 54, and brushes move as a unit for a small angle depending on the length of the arcuate slot 84, after which the pin 86 prevents further movement of the disc, and the brush 96 again moves into contact with the wide sector 90 of the conductor ring. Thus, if the slot 84 permits five degrees of lost motion in the pin and slot connection, the circuit will remain closed while the angle between the front bar and forward link of arm 29 increases from 12° to approximately 17°, and will not be closed again until the angle decreases to 12°. This lost motion serves in a similar manner at the other limit of angular movement to prevent repeated opening and closing of the circuit at extremely short intervals. The values given to the angles are illustrative and the machine can be designed so that the links swing through wider or narrower ranges of angular movement.

Resistance coils 105 in the motor circuit prevent rapid acceleration of the motor and carriage. A gradual acceleration is more advantageous because it causes more time to elapse before the carriage speed exceeds that of the tracer and by movement relative to the links causes the switch to open. Thus the gradual acceleration results in less frequent opening and closing of the motor circuit. This gradual acceleration has another advantage in that it insures against jarring of the torch and consequent rough places in the cut, when the carriage starts.

Forward and rearward movement of the carriage is also controlled by switches 116 and 118, which are located on the carriage and operated by a cam 120 on the bearing sleeve 34 or the arm 29. When the tracer causes the front bar 58 to move in close to the carriage so that the rearward link of the arm 29 approaches a position at right angles to the track, the cam 120 causes the switch 116 to close and supply power to the motor to drive the carriage away from the front bar at a speed faster than that of the tracer so that the rearward link of arm 29 moves clockwise with respect to the carriage in Fig. 5. This clockwise movement causes the cam 120 to move away from the switch 116, which opens by spring action and stops the motor 66.

The switches 116 and 118 are preferably snap switches so that they do not open and close at the same angular positions of the rearward link of arm 29. This lost motion results in less frequent opening and closing of the switches 116 and 118 when the tracer travels continuously in one direction. Other lost motion expedients to accomplish this same result can be substituted.

The cam 120 operates the switch 118 to cause the carriage to travel toward the front bar 58 whenever the rearward link of arm 29 approaches a position parallel to the track. The forward movement of the carriage is faster than the speed of the tracer and causes the rearward link of arm 29 to swing counterclockwise with respect to the carriage in Fig. 5.

The movement of the carriage is controlled by the switch means in the cup 54 or by the switches 116 and 118, depending on whether the forward or rearward link of arm 29 approaches its limit of movement first, and this in turn depends on whether the tracer is traveling on a path close to the track or at some distance from the track.

The switch means in the cup 54 and the switches 116 and 118 energize coils 122 and 124 which may be separate field windings of the motor 66 for causing forward or reverse rotation of the motor. Thus, when the coil 122 is energized, the motor rotates in one direction, and when the coil 124 is energized, the motor runs in the opposite direction. The operation of the motor can be controlled, without passing the motor current through these control switches, by using the coils 122 and 124 as solenoids to operate relay switches which carry the motor current. Limit switches, such as disclosed in my Patent No. 1,933,300, dated October 31, 1933, can be employed with this invention to prevent the carriage from traveling beyond the end of the track.

The preferred embodiment of the invention has been described, but changes and modifications can be made and various features of the invention can be used alone or in combination with other features without departing from the invention as defined in the claims.

I claim:
1. A cutting or welding machine comprising a carriage having means for supporting a torch and tracer on opposite sides of the path of movement of the carriage for universal movement in a plane with respect to the carriage, and connecting means for causing the torch and tracer to move along similar courses and execute a continuous cut or weld of any desired shape when the carriage is either stationary or in intermittent motion.

2. A cutting or welding machine, comprising a carriage with torch and tracer supporting means including two jointed arms connected with the carriage and a bar carried by the arms in position to support a torch and tracer on opposite sides of the path traveled by the carriage for movement in any and changing directions along similar courses to execute continuous cuts or welds during intermittent movement of the carriage.

3. In a cutting or welding machine, a carriage and means connected with the carriage for supporting a tracer for universal movement over a field extending lengthwise along the path of movement of the carriage, and for supporting a torch for universal movement over a field extending lengthwise along the other side of said path, and connections for causing the torch and tracer to move along similar courses to execute continuous cuts or welds during intermittent movement of the carriage.

4. Cutting or welding apparatus comprising a carriage, a supporting frame carried by the carriage, said frame including a bar extending at right angles to the direction of movement of the carriage and of sufficient length for supporting a torch and tracer on opposite sides of the path of the carriage, pivot connections between parts of the frame so that the bar is movable parallel to itself in any and changing directions with respect to the carriage when the carriage is either stationary or in intermittent motion.

5. A cutting or welding machine including a carriage, means stably supporting the carriage for intermittent movement during a continuous cutting or welding operation, and means for supporting a torch and tracer for universal movement in a plane over similar courses, and spaced transversely of the direction of intermittent movement of the carriage by a distance at least twice as great as the width of the carriage supporting means.

6. Cutting or welding apparatus including a truck, universal torch and tracer supporting means carried by the truck and of such length that the torch and tracer are spaced transversely of the direction of movement of the carriage by a distance at least twice as great as the tread of the truck wheels, and connections in the supporting means for causing the torch and tracer to move along similar courses whether the truck is stationary or in intermittent motion.

7. A cutting or welding machine comprising a truck and means carried by the truck for supporting a torch and tracer for universal movement in a plane over similar courses on opposite sides of the supporting surface on which the truck wheels run, said supporting means including connections for causing the torch and tracer to follow similar courses when the truck is moving as well as when the truck is stationary.

8. In a universal cutting or welding machine, a track, a carriage movable along the track, torch supporting means extending over a field on one side of the track, tracer supporting means extending over a field on the other side of the track, and connections between said supporting means for causing the torch and tracer to follow similar courses whether the carriage is stationary or in intermittent motion.

9. A universal cutting or welding machine including a carriage with transversely spaced supporting means, a frame for supporting a torch and tracer for universal movement in a plane along similar paths when the carriage is stationary or in intermittent motion, and two pivot connections joining said frame to the carriage and spaced transversely by a distance greater than the spacing of the carriage supporting means.

10. Cutting or welding apparatus comprising a truck having wheels stably supporting it for longitudinal movement along a track, pivot connections on the truck spaced transversely by a distance greater than the tread of the truck, and a frame supported from the truck by said pivot connections, said frame including means for supporting a torch and tracer for universal movement in a plane with respect to the truck and connecting means adapted to cause the torch to follow a path similar to that traveled by the tracer whether the truck is stationary or in intermittent motion.

11. A cutting or welding machine comprising a carriage having transversely spaced supporting means and arms fixed on the carriage and extending transversely beyond the supporting means, a folding parallelogram frame for supporting a torch and tracer for movement along similar paths in any and changing directions in a plane when the carriage is stationary or in intermittent motion, and pivot connections, adjacent the ends of the fixed arms, connecting the folding parallelogram frame with the carriage.

12. Cutting or welding apparatus comprising a truck having wheels stably supporting it for longitudinal movement along a track, arms rigidly connected to the truck and extending transversely from the truck, a folding parallelogram frame for supporting a torch and tracer for movement along similar paths in any and changing directions in a plane when the carriage is stationary or in intermittent motion, and pivot connections, on said arms and spaced transversely beyond the wheels, for connecting the folding parallelogram frame with the carriage.

13. Cutting or welding apparatus comprising a carriage, means for supporting a torch and tracer for universal movement in a plane with respect to the carriage, means for causing the carriage to move toward the supporting means during a cutting or welding operation when said supporting means moves away from the carriage beyond a given limit, and other means for causing the carriage to move in the opposite direction during a cutting or welding operation when the supporting means move toward the carriage beyond a given limit.

14. A cutting or welding machine including a power driven carriage, torch and tracer supporting means connected to the carriage for supporting a torch and tracer for movement in a plane along similar paths in any and changing directions with respect to the carriage, and automatic control means for supplying power to the carriage to move it toward or away from the supporting means during a cutting or welding operation when said supporting means moves beyond a given limit away from the carriage or toward the carriage, respectively.

15. In a cutting or welding machine, a truck movable along a track or other support, a motor for driving the truck, means carried by the truck including a folding parallelogram frame for supporting a torch and tracer for movement in a plane along similar paths in any and changing directions with respect to the truck, electric switch means for causing the truck to move along the track away from said parallelogram frame during a cutting or welding operation when the tracer moves across to the truck side of a given limit line, and electric switch means for causing the truck to move toward said frame when the tracer moves across a given line to the side remote from the truck.

16. A cutting or welding machine comprising a carriage, link means for supporting a torch and tracer for universal movement in a plane along similar paths, said means including a folding parallelogram frame supported from the carriage with the universally movable cross link of the parallelogram frame extending transversely of the direction of movement of the carriage, a motor for moving the carriage, and automatic switch means operated by the angular movement of certain links of said link means for causing operation of the motor.

17. A cutting or welding machine comprising a carriage, link means for supporting a torch and tracer for universal movement in a plane along similar paths, said means including a folding parallelogram frame and links supporting said frame from the carriage, automatic means operated by folding of the parallelogram frame for causing the carriage to move away from said frame, and automatic means operated by an extension of the parallelogram frame for causing the carriage to move toward said frame.

18. Cutting or welding apparatus comprising a truck, two parallel jointed arms pivotally connected to the truck at points spaced transversely of the direction of movement of the truck, two links having their opposite ends joined by pivot connections to the jointed arms and forming with the outer links of said jointed arms a folding parallelogram frame, for supporting a torch and tracer for universal movement in a plane along similar paths, electric motor means for moving the truck, switches adjacent the pivot connection of one jointed arm to the truck, and operated by pivotal movement of the arm with respect to the truck to cause the electric motor means to move the truck toward or from the folding parallelogram depending on the direction of movement of the jointed arm, and other switches adjacent the connection of one of the jointed arms with one of said links, and operated by changes in the angle between the arm and link, to cause the electric motor means to move the truck toward or from the folding parallelogram frame during a cutting or welding operation.

19. Cutting or welding apparatus comprising a carriage, means for supporting a torch and tracer for universal movement in a plane with respect to the carriage, means for causing the carriage to move toward the supporting means during a cutting or welding operation whenever the tracer moves across to the carriage side of a given limit line, and means for causing the carriage to move in the opposite direction during a cutting or welding operation whenever the tracer moves across another given limit line to the side remote from the carriage.

20. A cutting or welding machine including a power driven carriage, torch and tracer supporting means connected to the carriage for supporting a torch and tracer for movement in a plane along similar paths in any and changing directions with respect to the carriage, and automatic control means for supplying power to the carriage to move it toward or away from the supporting means during a cutting or welding operation whenever the tracer moves across a given limit line to the side remote from the carriage, or across another limit line to the carriage side, respectively.

21. A cutting or welding machine including in combination, torch and tracer supporting means comprising spaced posts, jointed arms having pivot connections to the spaced posts, and parallel links connected with the jointed arms to form a folding parallelogram, a carriage supporting the post, and means for causing the carriage to move transversely of the parallel links so that the long dimension of the field over which the folding parallelogram swings extends across the width of the field along which the carriage travels.

JAMES L. ANDERSON.